US008850575B1

(12) United States Patent
Magi Shaashua et al.

(10) Patent No.: US 8,850,575 B1
(45) Date of Patent: Sep. 30, 2014

(54) GEOLOCATION ERROR TRACKING IN TRANSACTION PROCESSING

(75) Inventors: Triinu Magi Shaashua, Herzeliya (IL); Harel Efraim, Hod-Hasharon (IL); Alon Kaufman, Bnei-Dror (IL)

(73) Assignee: EMC Corporation, Hopkinton, MA (US)

( * ) Notice: Subject to any disclaimer, the term of this patent is extended or adjusted under 35 U.S.C. 154(b) by 224 days.

(21) Appl. No.: 13/340,768

(22) Filed: Dec. 30, 2011

(51) Int. Cl.
*G06F 11/00* (2006.01)

(52) U.S. Cl.
USPC ................. 726/22; 726/4; 726/30; 455/456.1

(58) Field of Classification Search
USPC ........... 726/22–26, 4, 30; 713/188; 455/456.1
See application file for complete search history.

(56) References Cited

U.S. PATENT DOCUMENTS

| | | | |
|---|---|---|---|
| 6,782,264 B2 * | 8/2004 | Anderson | 455/456.1 |
| 7,574,606 B1 | 8/2009 | Fan et al. | |
| 7,779,156 B2 * | 8/2010 | Alperovitch et al. | 709/240 |
| 7,861,286 B2 * | 12/2010 | M'Raihi et al. | 726/5 |
| 7,908,645 B2 * | 3/2011 | Varghese et al. | 726/4 |
| 8,095,519 B2 | 1/2012 | Delia et al. | |
| 8,250,156 B2 * | 8/2012 | Baek et al. | 709/206 |
| 8,327,141 B2 * | 12/2012 | Vysogorets et al. | 713/168 |
| 8,516,560 B2 * | 8/2013 | Sheets et al. | 726/6 |
| 8,532,026 B2 * | 9/2013 | Osborn | 370/328 |
| 8,533,118 B2 * | 9/2013 | Weller et al. | 705/44 |
| 2004/0023666 A1 * | 2/2004 | Moon et al. | 455/456.1 |
| 2005/0097320 A1 * | 5/2005 | Golan et al. | 713/166 |
| 2011/0047608 A1 * | 2/2011 | Levenberg | 726/7 |
| 2011/0196791 A1 * | 8/2011 | Dominguez | 705/44 |

\* cited by examiner

*Primary Examiner* — Amare F Tabor
(74) *Attorney, Agent, or Firm* — BainwoodHuang

(57) ABSTRACT

An improved technique tracks errors in collecting geolocation data associated with a transaction. Along these lines, an adaptive authentication engine stores information indicative of a failure to collect geolocation data associated with the transaction. In particular, this information takes the form of a geolocation collection state; the adaptive authentication engine stores such a state in a field of a database that contains historical transaction information. If a service provider failed to collect geolocation information for a transaction, the adaptive authentication engine stores a "Fail" value in the geolocation collection state field of the database entry associated with the transaction. Adaptive authentication techniques may then correlate such "Fail" values with other field values such as time of submission and device type. The result of such a correlation is to build a risk model based on geolocation collection error which the risk engine may then use to compute risk score.

17 Claims, 4 Drawing Sheets

26

| | 52 | 54 | 56 | 58 | 60 | 62 |
|---|---|---|---|---|---|---|
| | Username | Device Type | Geolocation | Geolocation Status | Date | Time |
| | User A | iPhone | EC2 | Fail | Friday | 2:30 |
| | User A | Blackberry | Tel Aviv | Good | Thursday | 14:15 |
| | User A | Blackberry | EC1 | Fail | Wednesday | 14:00 |
| | User A | Blackberry | Tel Aviv | Good | Tuesday | 13:30 |
| | User A | Blackberry | Tel Aviv | Good | Monday | 14:00 |
| | User B | iPhone | EC2 | Fail | Thursday | 2:33 |
| | User B | iPhone | EC2 | Fail | Thursday | 2:30 |
| | User B | iPhone | EC1 | Fail | Wednesday | 14:00 |
| | User B | iPhone | EC1 | Fail | Tuesday | 13:30 |
| | User B | iPhone | EC1 | Fail | Monday | 14:00 |

GEOLOCATION ERROR TRACKING IN TRANSACTION PROCESSING

BACKGROUND

Some service providers use conventional risk-based authentication systems to assess a risk of processing customer transactions. For example, an online bank may employ a risk engine of such a risk-based authentication system to assign risk scores to banking transactions where higher risk scores indicate higher risk.

In generating a risk score, the risk score engine takes as input values of various transaction attributes (e.g., time of receipt, geolocation). For each customer of the online bank, there is an associated history based on values of the attributes associated with previous transactions involving that customer. The risk engine incorporates the history associated with the customer into an evaluation of the risk score. Significant variation of one or more attribute values from those in the customer's history may signify that the banking transaction has a high risk.

For example, suppose that a particular customer historically submitted transaction requests to the online bank at 3:00 PM from Tel Aviv, and, under the customer's identifier, a user submits a new transaction request at 2:00 AM from Boston. In this case, the risk engine would assign a larger risk score to a transaction resulting from the new transaction request.

SUMMARY

Unfortunately, there are deficiencies with the above-described conventional risk-based authentication systems. For example, suppose that a user submits a transaction request to an online bank from a browser application running on a mobile device that has a GPS unit. In this case, the online bank derives the user's geolocation from the GPS coordinates output from the GPS unit of the device. Oftentimes, however, the GPS unit fails to obtain GPS coordinates for a variety of reasons. In such a case, the online bank receives an error message stating that the attempt to obtain the user's geolocation failed. Conventional risk-based authentication systems ignore the failure and do not store information relating to geolocation in such situations. In this way, the risk engine is not able to provide the most accurate risk score for the transaction.

In contrast to conventional transaction risk engines which ignore failures to collect geolocation information, an improved technique tracks errors in collecting geolocation data associated with a transaction. Along these lines, an adaptive authentication engine stores information indicative of a failure to collect geolocation data associated with the transaction. In particular, this information takes the form of a geolocation collection state; the adaptive authentication engine stores such a state in a field of a database that contains historical transaction information. If a service provider failed to collect geolocation information for a transaction, the adaptive authentication engine stores a "Fail" value in the geolocation collection state field of the database entry associated with the transaction. Adaptive authentication techniques may then correlate such "Fail" values with other field values such as time of submission and device type. The result of such a correlation is to build a risk model based on geolocation collection error which the risk engine may then use to compute risk score.

Advantageously, the improved technique allows for the uncovering of sources of risk which had not previously been apparent. In particular, a fraudster, knowing that an online bank collects geolocation information from devices that attempt to log into accounts, will deactivate the GPS unit of his device, thus inducing a geolocation error collection failure. Nevertheless, the legitimate customer for that account would likely have kept his GPS unit activated during a transaction. The failure to collect geolocation information triggers the adaptive authentication engine to assign a high risk score to the fraudster's transaction, a safeguard that was not previously in place.

One embodiment of the improved technique is directed to a method of identifying risky transactions. The method includes receiving, from a service provider, a transaction and a message which includes information indicative of a failure to collect geolocation data associated with the transaction. The method also includes generating an authentication result based on the information indicative of the failure to collect geolocation data associated with the transaction. The method further includes sending the authentication result to the service provider.

Additionally, some embodiments of the improved technique are directed to a system for identifying risky transactions. The system includes a network interface coupled to a network, a memory and processor coupled to the memory, the processor configured to carry the method of identifying risky transactions.

Furthermore, some embodiments of the improved technique are directed to a computer program product having a non-transitory computer readable storage medium which stores code including a set of instructions to carry the method of identifying risky transactions.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 3 is a schematic diagram illustrating the database stored in the storage device shown in FIG. 1.

DETAILED DESCRIPTION

An improved technique tracks errors in collecting geolocation data associated with a transaction. Along these lines, an adaptive authentication engine stores information indicative of a failure to collect geolocation data associated with the transaction. In particular, this information takes the form of a geolocation collection state; the adaptive authentication engine stores such a state in a field of a database that contains historical transaction information. If a service provider failed to collect geolocation information for a transaction, the adaptive authentication engine stores a "Fail" value in the geolocation collection state field of the database entry associated with the transaction. Adaptive authentication techniques may then correlate such "Fail" values with other field values such as time of submission and device type. The result of such a correlation is to build a risk model based on geolocation collection error which the risk engine may then use to compute risk score.

Figure 1:
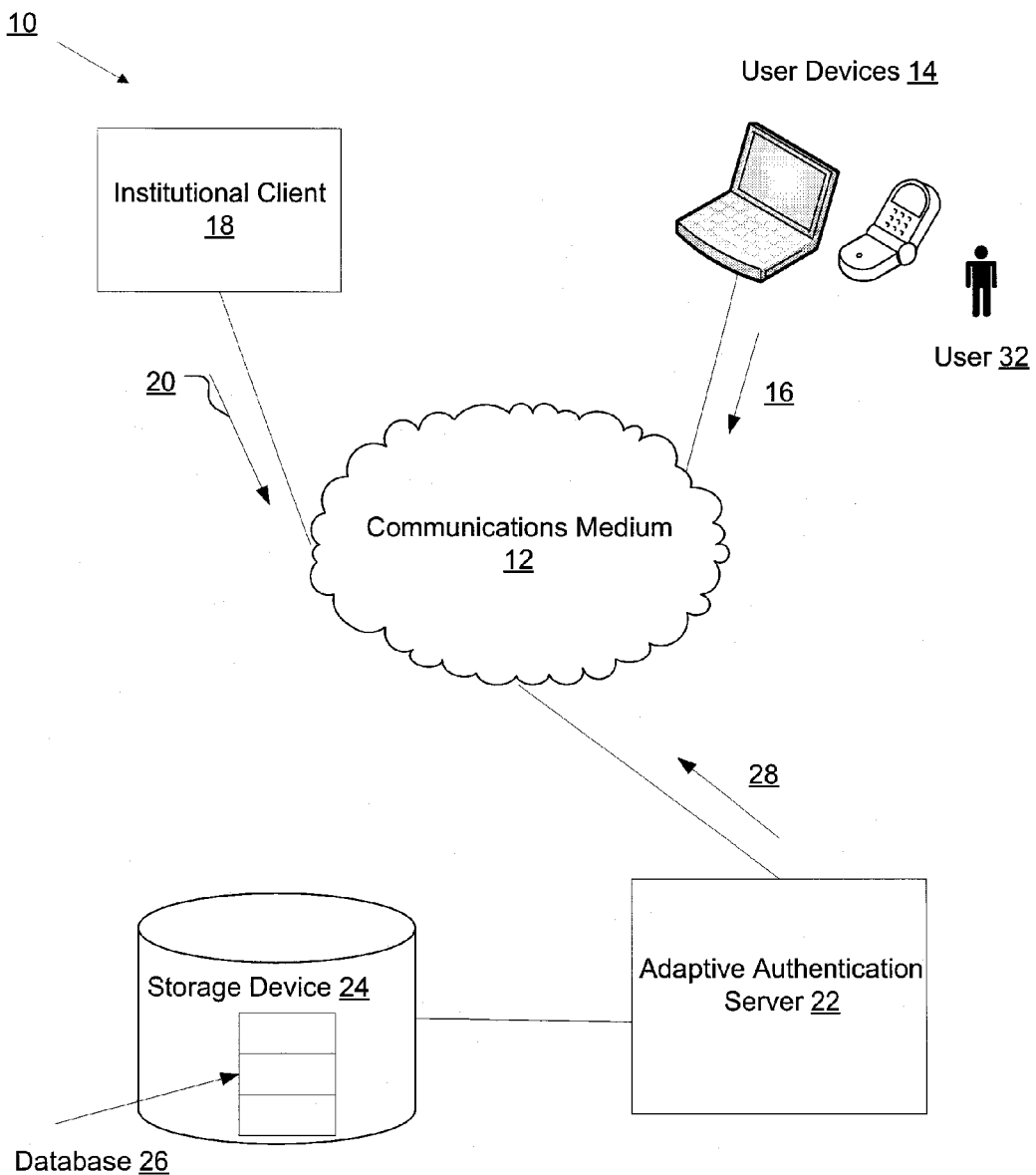
FIG. 1 is a schematic diagram illustrating an electronic environment for carrying out the improved technique.

FIG. 1 illustrates an electronic environment 10 for carrying out the improved technique. Electronic environment 10 includes communications medium 12, user devices 14, institutional client 18, and adaptive authentication server 22.

Communication medium 12 provides network connections between user devices 14, institutional client 18, and adaptive authentication server 22. Communications medium 12 may implement a variety of protocols such as TCP/IP, UDP, ATM, Ethernet, Fibre Channel, combinations thereof, and the like. Furthermore, communications media 12 may include various components (e.g., cables, switches/routers, gateways/bridges, NAS/SAN appliances/nodes, interfaces, etc.). Moreover, the communications medium 12 are capable of having a variety of topologies (e.g., queue manager-and-spoke, ring, backbone, multi drop, point to-point, irregular, combinations thereof, and so on).

User devices 14 include smartphones, personal digital assistants, laptop computers, desktop computers, tablet computers, and the like constructed and arranged to submit transaction request 16 to institutional client 18 via communications medium 12.

Institutional client 18 is constructed and arranged to send transaction 20 to adaptive authentication server 22 via communications medium 12. Institutional client 18 is also constructed and arranged to obtain geolocation data from transaction request 16. Institutional client 18 is further constructed and arranged to receive adaptive authentication result 28 from adaptive authentication server 22.

Adaptive authentication server 22 is constructed and arranged to receive transaction 20 from institutional client 18 over communications medium 12. Adaptive authentication server 22 is also constructed and arranged to access transaction data in database 26 stored on storage device 24. Adaptive authentication server 22 is further constructed and arranged to incorporate geolocation collection error data into adaptive authentication results 28. Adaptive authentication server 22 is further constructed and arranged to send adaptive authentication results 28 to institutional client 18.

During operation, a user 32 on user device 14 submits a transaction request 16 under a customer's user identifier to institutional client 18 via communications medium 12. From transaction request 16, institutional client 18 attempts to acquire geolocation information for user device 14. For example, if user device 14 is a smartphone with a GPS unit, institutional client 18 derives geolocation information from GPS coordinates embedded within transaction request 16.

When institutional client 18 is unable to acquire geolocation information from transaction request 16, institutional client 18 considers this inability as an error in collecting geolocation information. In this case, institutional client 18 denotes the state of geolocation collection as "Fail" in transaction 20. Once the state of geolocation collection is noted in transaction 20, institutional client 18 sends transaction 20 to adaptive authentication server 22 in order to obtain authentication results concerning user 32.

Adaptive authentication server 22 receives transaction 20 and searches transaction 20 for a current state of geolocation correction. When the current state is "Fail," adaptive authentication server 22 generates an authentication result 28 based on values of states of geolocation correction for transactions associated with the customer's user identifier. For example, when the current state is "Fail," yet in previous transactions occurring at similar times of the day, the state of geolocation collection is "Good," adaptive authentication server 22 generates authentication result 28 which includes a risk core implying that user 32 is a high risk of being a fraudulent user.

In some arrangements, adaptive authentication server 22 obtains information concerning the previous transactions from database 26 stored on storage device 24. Database 26 contains a set of entries, each entry being associated with a transaction. Each entry includes values of attributes of the associated transaction. One of these attributes corresponds to the state of geolocation correction. In generating authentication result 28, adaptive authentication server 22 accesses database 26 and locates entries of previous transactions associated with the customer's user identifier. Adaptive authentication server 22 then reads the values of the states of geolocation correction from the previous transactions obtained from database 26.

After generating authentication result 28, adaptive authentication server 22 sends authentication result 28 to institutional client 18 over communications medium 12. Based on authentication result 28, institutional client 18 can process transaction 20, cancel transaction 20, or request additional information from user 32.

Advantageously, the improved technique allows for the uncovering of sources of risk which had not previously been apparent. In particular, a fraudster in the form of user 32, knowing that institutional client 18 collects geolocation information from user device 14 that attempt to log into accounts, will deactivate the GPS unit of his device, thus inducing a geolocation error collection failure. Nevertheless, the legitimate customer for that account would likely have kept his GPS unit activated during a transaction. The failure to collect geolocation information triggers the adaptive authentication server 22 to assign a high risk score to transaction 20, a safeguard that was not previously in place.

Figure 2:
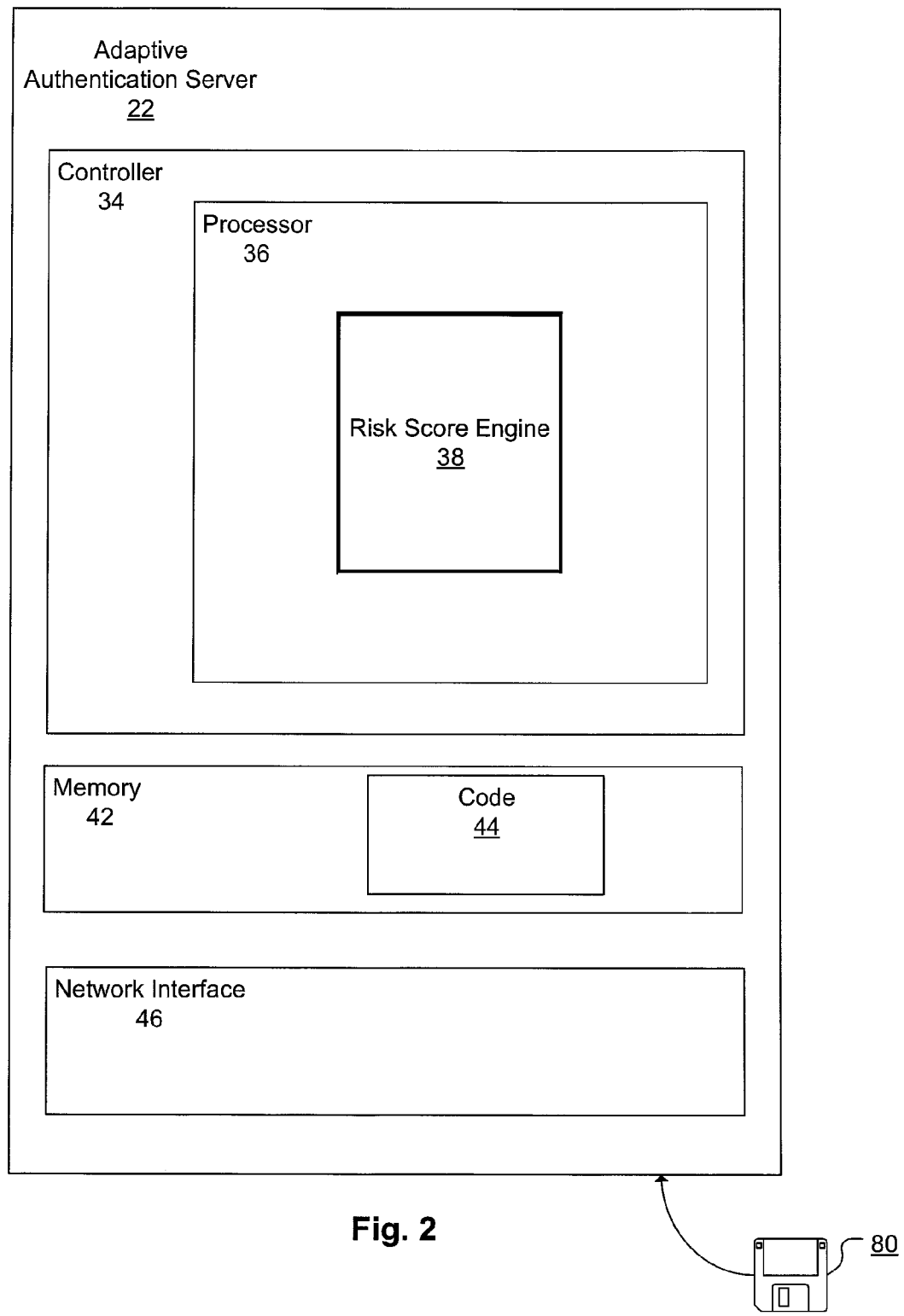
FIG. 2 is a schematic diagram illustrating the adaptive authentication engine within the electronic environment shown in FIG. 1.

Further details concerning adaptive authentication server 22 are considered with respect to FIG. 2.

FIG. 2 illustrates components of adaptive authentication server 22. Adaptive authentication server 22 includes a controller 34 which in turn includes processor 36, a memory 42 and a network interface 46.

Memory 42 is configured to store code which includes code 44 constructed and arranged to identify risky transactions. Memory 42 is further configured to store transaction 20 received from institutional client 18. Memory 42 generally takes the form of, e.g., random access memory, flash memory or a non-volatile memory.

Processor 36 takes the form of, but is not limited to, Intel or AMD-based MPUs, and can include a single or multi-cores each running single or multiple threads. Processor 36 is coupled to memory 42 and is configured to execute instructions from code 44 stored in memory 42. Processor 36 includes risk score engine 38.

Risk score engine 38 is constructed and arranged to assign a risk score to a transaction based on values of attributes of previous transactions and transaction 20 stored in memory 42.

Network interface 46 is constructed and arranged to send and receive data over communications medium 12. Specifically, network interface 46 is configured to receive transaction 20 from institutional client 18 over communications medium 12 and to send transaction result 28 to institutional client 18 over communications medium 12. Also, network interface 42 is constructed and arranged to receive data from storage device 15.

During operation, network interface receives transaction 20. Upon the receipt, processor 36 stores its attribute values, including the value of the state of geolocation collection, in memory 42. Risk score engine 38 then executes instructions derived from code 44 to access these attribute values from memory 42 and assigns a risk score to transaction 20. In some arrangements, the risk score is based on a set of Bayesian weights, each of which corresponds to an attribute associated with transaction 20. Risk score engine 38 derives the value of each Bayesian weight from values of the attribute to which the Bayesian weight corresponds for previous transactions which are stored in database 26.

In some arrangements, processor 36 sends a command to perform a lookup operation on database 26 to storage device 24 via network interface 46. In some arrangements, the lookup operation is configured to return a specified number of previous transactions associated with the customer's user identifier. In this case, network interface 46 receives the previous transactions. Processor 36 identifies those previous transactions that have the value of the state of geolocation collection being equal to that for transaction 20; processor 36 then computes the percentage of previous transactions that processor 36 identifies as having such a value of the state of geolocation collection. Risk score engine 38 then accesses this percentage for use in assigning a risk score to transaction 20.

Once risk score engine 38 assigns a risk score to transaction 20, network interface sends the risk score in the form of authentication result 28 to institutional client 18 via communications medium 12.

In some arrangements, transaction 20 includes information concerning a source of the geolocation collection error. For example, user 32 may be in a place such as inside a building where the GPS unit is not able to transmit the GPS coordinates of user device 14. In another example, user 32 may have deactivated the GPS unit altogether in order to prevent the transmission of the GPS coordinates of user device 14. Such a distinction between these sources of error creates a more accurate picture of the risk associated with transaction 20. Further details of this additional information is managed and used are shown with regard to FIG. 3.

FIG. 3 illustrates an example of a portion 50 of database 26 stored in storage device 24. Portion 50 includes a set of entries corresponding to transactions associated with two usernames (A and B). Beside the username field, fields of database 26 include device type 54, geolocation 56, geolocation status 58, date 60 of transaction, and time transaction was received 62.

In this example, the value of the geolocation field 56 when the corresponding value of the geolocation status 58 is "Fail" is either "EC1" or "EC2." The value "EC1" represents the case where the GPS unit was activated but unable to transmit. The value "EC2," on the other hand, represents the case where the GPS unit was deactivated.

Consider first the entries corresponding to User A. The four previous transactions (taking place Monday, Tuesday, Wednesday, and Thursday) happen at roughly the same time per day, with the same device, and with the GPS unit activated. There was one error (Wednesday) acquiring geolocation data. On Friday, however, the transaction was received at an odd hour in the morning rather than in the afternoon, and originated from an iPhone rather than the usual Blackberry. In addition, the geolocation error code stored in the geolocation field 56 implies that the GPS unit was deactivated. Because the customer historically had the GPS unit activated, the transaction is identified as risky.

Now consider the entries corresponding to User B. The first three transactions took place on Monday, Tuesday, and Wednesday, and all failed to collect geolocation data despite an activated GPS unit. On Thursday, however, there are two transactions within minutes of each other with the GPS deactivated. In this case, the risk score for the fourth transaction is high, while that for the fifth is higher still.

It should be understood that it is changes in the patterns of errors, rather than the nature of the errors themselves, that are the prime ingredient in the risk score assignment. That said, failure to collect geolocation data due to voluntary actions such as deactivating the GPS unit, especially when the GPS unit is normally turned on, may increase risk score.

It should also be understood that other factors beside the change in geolocation error code determines risk score. In particular, if only a small percentage of transactions have the error code of the current transaction, then the risk score is increased. On the other hand, if enough transactions have the error code, then the risk score may even be decreased, as the risk score engine 38 may discern a pattern of usage involving the particular error code.

In some arrangements, the dependence of risk score on factors such as the source of the failure to collect geolocation data is subject to change due to new authentication data. For example, institutional client 18 may investigate the riskiest transactions as determined by adaptive authentication server 22. Institutional client 18 would send the results of such an investigation to adaptive authentication server 22. Processor 22 would run the results through a machine learning engine which updates the Bayesian weights for use by risk score engine 38 in assigning risk scores to transactions.

Figure 4:
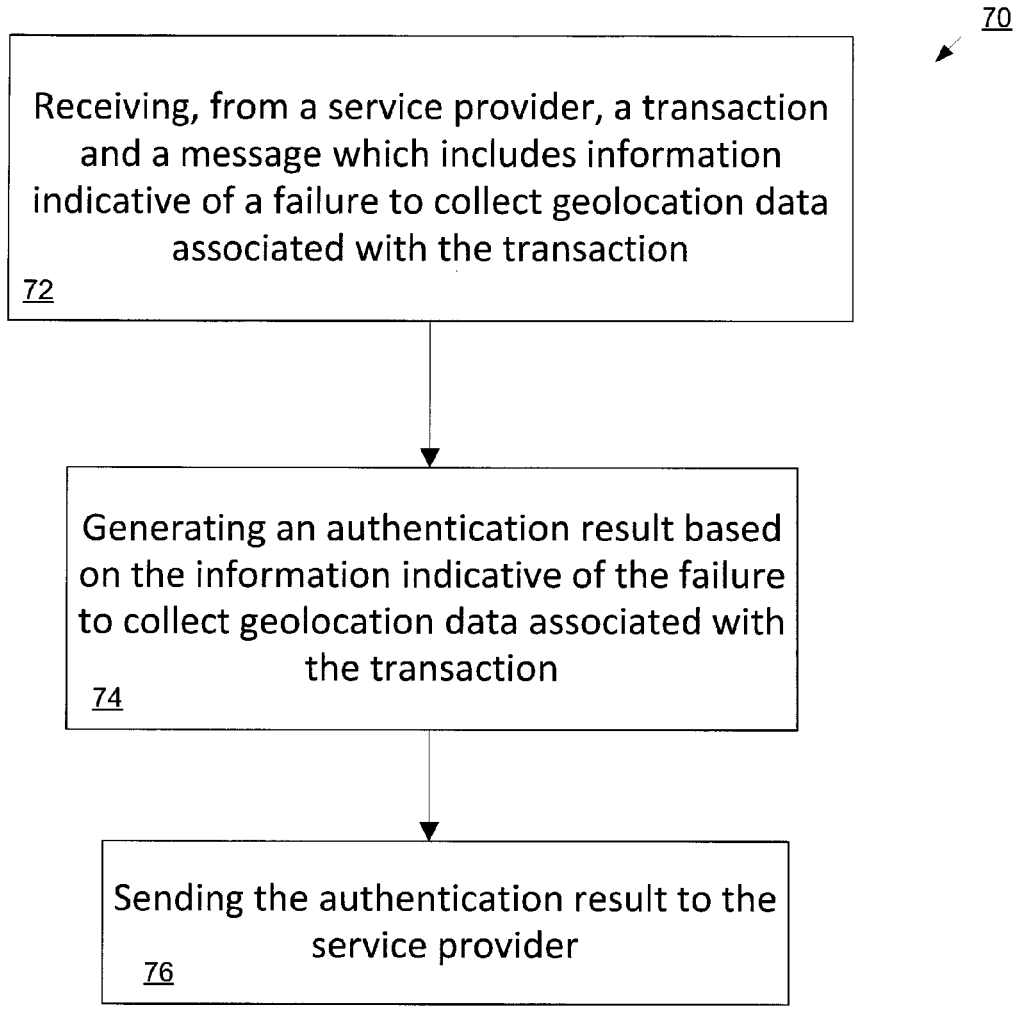
FIG. 4 is a flow chart illustrating a method of carrying out the improved technique within the electronic environment shown in FIG. 1.

FIG. 4 illustrates a method 70 of identifying risky transactions. In step 72, a transaction and a message which includes information indicative of a failure to collect geolocation data associated with the transaction is received from a service provider. In step 74, an authentication result is generated based on the information indicative of the failure to collect geolocation data associated with the transaction. In step 76, the authentication result is sent to the service provider While various embodiments of the invention have been particularly shown and described, it will be understood by those skilled in the art that various changes in form and details may be made therein without departing from the spirit and scope of the invention as defined by the appended claims.

For example, while the example illustrated above showed two error codes, there can be any number of distinct error codes. Such additional error codes can represent poor environmental conditions, interference, poor reception associated with a locale, among others.

Furthermore, it should be understood that some embodiments are directed to adaptive authentication server 22 which is constructed and arranged to identify risky transactions. Some embodiments are directed to adaptive authentication server 22. Some embodiments are directed to a system which identifies risky transactions. Some embodiments are directed to a process of identifying risky transactions. Also, some embodiments are directed to a computer program product which enables computer logic to identify risky transactions.

In some arrangements, adaptive authentication server 22 is implemented by a set of processors or other types of control/processing circuitry running software. In such arrangements, the software instructions can be delivered to adaptive authentication server 22 in the form of a computer program product 80 (FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of identifying risky transactions, comprising:
receiving, from a service provider, a transaction and a message which includes information indicative of a failure to collect geolocation data associated with the transaction;
generating an authentication result based on the information indicative of the failure to collect geolocation data associated with the transaction; and
sending the authentication result to the service provider;
wherein receiving the transaction and the message includes:
obtaining, as part of the message, a value of a geolocation error code indicative of a type of failure to collect geolocation data associated with the transaction;
wherein the transaction is stored in a current entry of a set of entries of a database, the entry including a current value of a geolocation field;
wherein previous entries of the set of entries of the database store information associated with previous transactions; and
wherein generating the authentication result includes:
producing a percentage of a specified number of previous transactions having a value of the geolocation field being equal to the current value of the geolocation error code; and
assigning a risk score to the transaction, the risk score being based on the percentage of the specified number of previous transactions.

2. A method according to claim 1,
wherein the method further comprises:
storing the current value of the geolocation error code in the geolocation field of the current entry.

3. A method according to claim 2, wherein each entry of the set of entries includes values of transaction attribute fields;
wherein assigning the risk score includes:
providing weights to values of transaction attribute fields of the current entry and corresponding values of transaction attribute fields of the entries of the specified number of previous transactions to produce weighted values of the transaction attribute fields, the risk score being further based on the weighted values of the transaction attribute fields.

4. A method according to claim 3, wherein the service provider performs a manual investigation whether or not selected transactions having a failure to collect geolocation data associated with the transactions, the manual investigation producing an investigation result;
wherein the method further comprises:
receiving the investigation result from the service provider; and
updating the weights to reflect the investigation result.

5. A method according to claim 2, wherein the method further comprises:
if the current value of the geolocation error code indicates that the failure to collect geolocation data was a result of a voluntary action on the part of a user, and the percentage of the specified number of previous transactions having the value of the geolocation field being equal to the current value of the geolocation error code is less than a threshold value, increasing the risk score for the transaction; and
if the current value of the geolocation error code indicates that the failure to collect geolocation data was a result of a voluntary action on the part of a user, and the percentage of the specified number of previous transactions having the value of the geolocation field being equal to the current value of the geolocation error code is greater than the threshold value, decreasing the risk score for the transaction.

6. A system constructed and arranged to identify risky transactions, the system comprising:
a network interface;
a memory; and
a controller which includes controlling circuitry coupled to the memory, the controlling circuitry being constructed and arranged to:
receive, from a service provider, a transaction and a message which includes information indicative of a failure to collect geolocation data associated with the transaction;
generate an authentication result based on the information indicative of the failure to collect geolocation data associated with the transaction; and
send the authentication result to the service provider;
wherein receiving the transaction and the message includes:
obtaining, as part of the message, a value of a geolocation error code indicative of a type of failure to collect geolocation data associated with the transaction;
wherein the transaction is stored in a current entry of a set of entries of a database, the entry including a current value of a geolocation field;
wherein previous entries of the set of entries of the database store information associated with previous transactions; and
wherein generating the authentication result includes:
producing a percentage of a specified number of previous transactions having a value of the geolocation field being equal to the current value of the geolocation error code; and
assigning a risk score to the transaction, the risk score being based on the percentage of the specified number of previous transactions.

7. A system according to claim 6,
wherein the controlling circuitry is further constructed and arranged to:
store the current value of the geolocation error code in the geolocation field of the current entry.

8. A system according to claim 7, wherein each entry of the set of entries includes values of transaction attribute fields;
wherein assigning the risk score includes:
providing weights to values of transaction attribute fields of the current entry and corresponding values of transaction attribute fields of the entries of the specified number of previous transactions to produce weighted values of the transaction attribute fields, the risk score being further based on the weighted values of the transaction attribute fields.

9. A system according to claim 8, wherein the service provider performs a manual investigation whether or not selected transactions having a failure to collect geolocation data associated with the transactions, the manual investigation producing an investigation result;
wherein the controlling circuitry is further constructed and arranged to:
receive the investigation result from the service provider; and
update the weights to reflect the investigation result.

10. A system according to claim 7, wherein the controlling circuitry is further constructed and arranged to:
if the current value of the geolocation error code indicates that the failure to collect geolocation data was a result of a voluntary action on the part of a user, and the percentage of the specified number of previous transactions having the value of the geolocation field being equal to the current value of the geolocation error code is less than a threshold value, increase the risk score for the transaction; and if the current value of the geolocation error code indicates that the failure to collect geolocation data was a result of a voluntary action on the part of a user, and the percentage of the specified number of previous transactions having the value of the geolocation field being equal to the current value of the geolocation error code is greater than the threshold value, decrease the risk score for the transaction.

11. A computer program product having a non-transitory, computer-readable storage medium which stores code to identify risky transactions, the code including instructions to:

receive, from a service provider, a transaction and a message which includes information indicative of a failure to collect geolocation data associated with the transaction;

generate an authentication result based on the information indicative of the failure to collect geolocation data associated with the transaction; and send the authentication result to the service provider;

wherein receiving the transaction and the message includes:

obtaining, as part of the message, a value of a geolocation error code indicative of a type of failure to collect geolocation data associated with the transaction;

wherein the transaction is stored in a current entry of a set of entries of a database, the entry including a current value of a geolocation field;

wherein previous entries of the set of entries of the database store information associated with previous transactions; and wherein generating the authentication result includes:

producing a percentage of a specified number of previous transactions having a value of the geolocation field being equal to the current value of the geolocation error code; and assigning a risk score to the transaction, the risk score being based on the percentage of the specified number of previous transactions.

12. A computer program product according to claim 11, wherein the code further includes instructions to:

store the current value of the geolocation error code in the geolocation field of the current entry.

13. A computer program product according to claim 12, wherein each entry of the set of entries includes values of transaction attribute fields;

wherein assigning the risk score includes:

providing weights to values of transaction attribute fields of the current entry and corresponding values of transaction attribute fields of the entries of the specified number of previous transactions to produce weighted values of the transaction attribute fields, the risk score being further based on the weighted values of the transaction attribute fields.

14. A computer program product according to claim 13, wherein the service provider performs a manual investigation whether or not selected transactions having a failure to collect geolocation data associated with the transactions, the manual investigation producing an investigation result;

wherein the code further includes instructions to:

receive the investigation result from the service provider; and update the weights to reflect the investigation result.

15. A method as in claim 1, wherein generating the authentication result includes:

providing, as the authentication result, an indication that the service provider is to request additional information from a user; and wherein the service provider is configured to request additional information from the user in response to the indication.

16. A method as in claim 1, wherein a transaction includes a communication containing transaction data associated with the transaction; and wherein receiving the transaction from the service provider includes obtaining the communication containing the transaction data associated with the transaction.

17. A method of identifying risky transactions, comprising:

receiving, from a service provider and by a processor, a transaction and a message which includes information indicative of a failure to collect geolocation data associated with the transaction;

generating, by the processor, an authentication result based on the information indicative of the failure to collect geolocation data associated with the transaction; and sending, by the processor, the authentication result to the service provider;

wherein receiving the transaction and the message includes:

obtaining, as part of the message, a value of a geolocation error code indicative of a type of failure to collect geolocation data associated with the transaction;

wherein the transaction is stored in a current entry of a set of entries of a database, the entry including a current value of a geolocation field;

wherein previous entries of the set of entries of the database store information associated with previous transactions; and wherein generating the authentication result includes:

producing a percentage of a specified number of previous transactions having a value of the geolocation field being equal to the current value of the geolocation error code; and assigning a risk score to the transaction, the risk score being based on the percentage of the specified number of previous transactions.

* * * * *